United States Patent [19]

Latiolais et al.

[11] Patent Number: 5,654,377

[45] Date of Patent: Aug. 5, 1997

[54] ETHYLENE-ALKYL ACRYLATE COPOLYMERS AND DERIVATIVES HAVING IMPROVED MELT-POINT TEMPERATURES AND ADHESIVE STRENGTH AND PROCESSES FOR PREPARING SAME

[75] Inventors: Jerry G. Latiolais, Groves; J. Paul Gathright, Orange; Nicholas R. Galante, Orange; M. Stephen Galland, Orange; J. Diores Gallet, Orange; Lewis R. Compton, Orange; George L. Baker, Bridge City, all of Tex.; James H. Wang, Appleton, Wis.

[73] Assignee: Chevron Chemical Company, San Ramon, Calif.

[21] Appl. No.: 462,713

[22] Filed: Jun. 5, 1995

Related U.S. Application Data

[60] Division of Ser. No. 233,180, Apr. 26, 1994, Pat. No. 5,571,878, which is a continuation-in-part of Ser. No. 764,861, Sep. 24, 1991, abandoned.

[51] Int. Cl.[6] .................... C08F 8/44; C08F 8/42; C08F 10/02; C08F 20/16
[52] U.S. Cl. .................... 525/330.6; 526/65; 526/66
[58] Field of Search .................... 525/330.6; 526/65, 526/66

[56] References Cited

U.S. PATENT DOCUMENTS

| | | | |
|---|---|---|---|
| 3,789,035 | 1/1974 | Iwami | 525/330.6 |
| 4,252,924 | 2/1981 | Chatterjee | 525/330.6 |
| 4,638,034 | 1/1987 | McClain | 525/330.6 |
| 4,956,418 | 9/1990 | Tanaka | 525/330.6 |

*Primary Examiner*—David Buttner
*Attorney, Agent, or Firm*—M. H. Michel; C. D. Holland

[57] ABSTRACT

A composition is disclosed which comprises a copolymer of ethylene and alkyl acrylate having improved melt-point temperature and/or improved adhesiveness to polymeric substrates. A process for making these compositions is also disclosed. In addition, an ionomer made from the copolymer and a method for making the ionomer are disclosed.

9 Claims, 4 Drawing Sheets

ETHYLENE-ALKYL ACRYLATE COPOLYMERS AND DERIVATIVES HAVING IMPROVED MELT-POINT TEMPERATURES AND ADHESIVE STRENGTH AND PROCESSES FOR PREPARING SAME

This application is a division of application Ser. No. 08/233,180, filed Apr. 26, 1994, now U.S. Pat. No. 5,571,878, which in turn is a continuation-in-part of application Ser. No. 07/764,861, filed Sep. 24, 1991, and now abandoned.

FIELD OF THE INVENTION

The present invention relates to copolymers of ethylene and an alkyl acrylate, processes for preparing said copolymers, and compositions and films made from said copolymers.

BACKGROUND OF THE INVENTION

Copolymers of ethylene and acrylate esters and methods for their manufacture have been reported in the literature, such as in U.S. Pat. No. 2,200,429, U.S. Pat. No. 2,953,551 and U.S. Pat. No. 3,350,372. The '372 patent to Anspon discloses an ethylene acrylate ester copolymer wherein the acrylate esters include, for example, methyl acrylate, 2-butyl acrylate, 2-ethylhexyl acrylate, decyl acrylate, octadecyl acrylate and the corresponding esters of methacrylic acid. The '372 patent states that preferred copolymers contain a maximum of 0.5 mole of acrylate ester per mole of ethylene, i.e., 33 mole percent acrylate ester, and that the copolymers ordinarily will contain at least 1 mole percent of the acrylate ester and preferably will contain 0.025–0.20 and more especially 0.05 to 0.15 mole of acrylate ester per mole of ethylene. For ethylene-methyl acrylate copolymer ("EMA"), 0.50 mole of acrylate per mole of ethylene would be approximately 60 weight percent methyl acrylate based on EMA copolymer, and 0.20 mole of acrylate per mole of ethylene would be approximately 38 weight percent methyl acrylate.

U.S. Pat. No. 3,756,996 to D. W. Pugh et al., which is hereby incorporated by reference in its entirety, discloses an apparatus and method for polymerizing ethylene and other monomers in a multi-zoned reactor system.

These ethylene-alkyl acrylate ("EAA") copolymers have been excluded from some markets because the melt-point temperature has been lower than what the market required of the EAA copolymer having a given amount of alkyl acrylate. As more alkyl acrylate was incorporated into the copolymer to make the copolymer more rubbery, the melt-point temperature of the copolymer decreased sharply.

In addition, EAA copolymers have been excluded from other markets because EAA copolymers have not had sufficient adhesive strength to, e.g., layers or films of other polymers to bind the EAA and other polymers strongly enough to prevent delamination. The present invention provides EAA copolymers with improved melt-point temperature and/or improved adhesive strength, and a method for making these copolymers.

SUMMARY

This invention provides compositions comprising ethylene-alkyl acrylate copolymers, which copolymers have higher melt-point temperatures for a given percentage of alkyl acrylate in the copolymer than conventional ethylene-alkyl acrylate copolymers. In another embodiment, this invention provides compositions comprising ethylene-alkyl acrylate copolymers, which copolymers have improved adhesive strength to other polymers such as polyester or polypropylene than conventional EAA copolymers.

In particular, this invention discloses a composition comprising a copolymer of ethylene and alkyl acrylate, where the copolymer has a melt-point temperature of at least about 6 deg F. greater than a reference copolymer which has the same amount and type of alkyl acrylate and ethylene and which is made in a multi-zone autoclave reactor with the ratio of alkyl acrylate to ethylene in a reaction zone being about equal to the overall ethylene to alkyl acrylate ratio fed to the multi-zone autoclave reactor. Some of these copolymers also exhibit a substantial increase in adhesive strength to other polymers over reference copolymers. Preferred embodiments include ethylene-methyl acrylate and ethylene-butyl acrylate copolymers.

In another embodiment, this invention discloses a composition comprising an ethylene-alkyl acrylate copolymer which has an adhesive strength to polyester or to polypropylene at least about 20% greater than a reference copolymer which has the same amount and type of alkyl acrylate and ethylene and which is made in a multi-zone autoclave reactor with the ratio of alkyl acrylate to ethylene in a reaction zone being about equal to the overall ethylene to alkyl acrylate ratio fed to the multi-zone autoclave reactor.

The invention also provides a process for the preparation of ethylene-alkyl acrylate copolymers comprising:

A. feeding overall an amount by weight, A, of alkyl acrylate and an amount by weight, E, of ethylene to a multi-zone autoclave polymerization reactor;

B. introducing an effective amount of an initiator and at least a portion, $E_1$, of the total amount of ethylene into a first reaction zone of the reactor;

C. concurrently introducing a portion, $A_1$, of alkyl acrylate to said first reaction zone such that the ratio $A_1/E_1$ is at least about 20% more than or is at least about 20% less than the ratio A/E for the reactor overall; and D. feeding any remaining portions of initiator, ethylene and alkyl acrylate to a subsequent reaction zone or zones.

The invention also provides compositions comprising films or layers of the polymer of this invention which are contiguous to a second polymeric film or layer such as polypropylene or polyester.

Among other factors, this invention is based on the discovery that feeding different ratios of ethylene to alkyl acrylate comonomer in at least two reaction zones of a multi-zone autoclave reactor increases the melt-point temperature of the resultant EAA copolymer. This invention is also based on the discovery that feeding different ratios of ethylene to alkyl acrylate comonomer in at least two reaction zones of a multi-zone autoclave reactor can increase the adhesive strength of the resultant EAA copolymer. These advantages and others are further described below.

DETAILED DESCRIPTION OF THE INVENTION AND PREFERRED EMBODIMENTS

Figure 1:
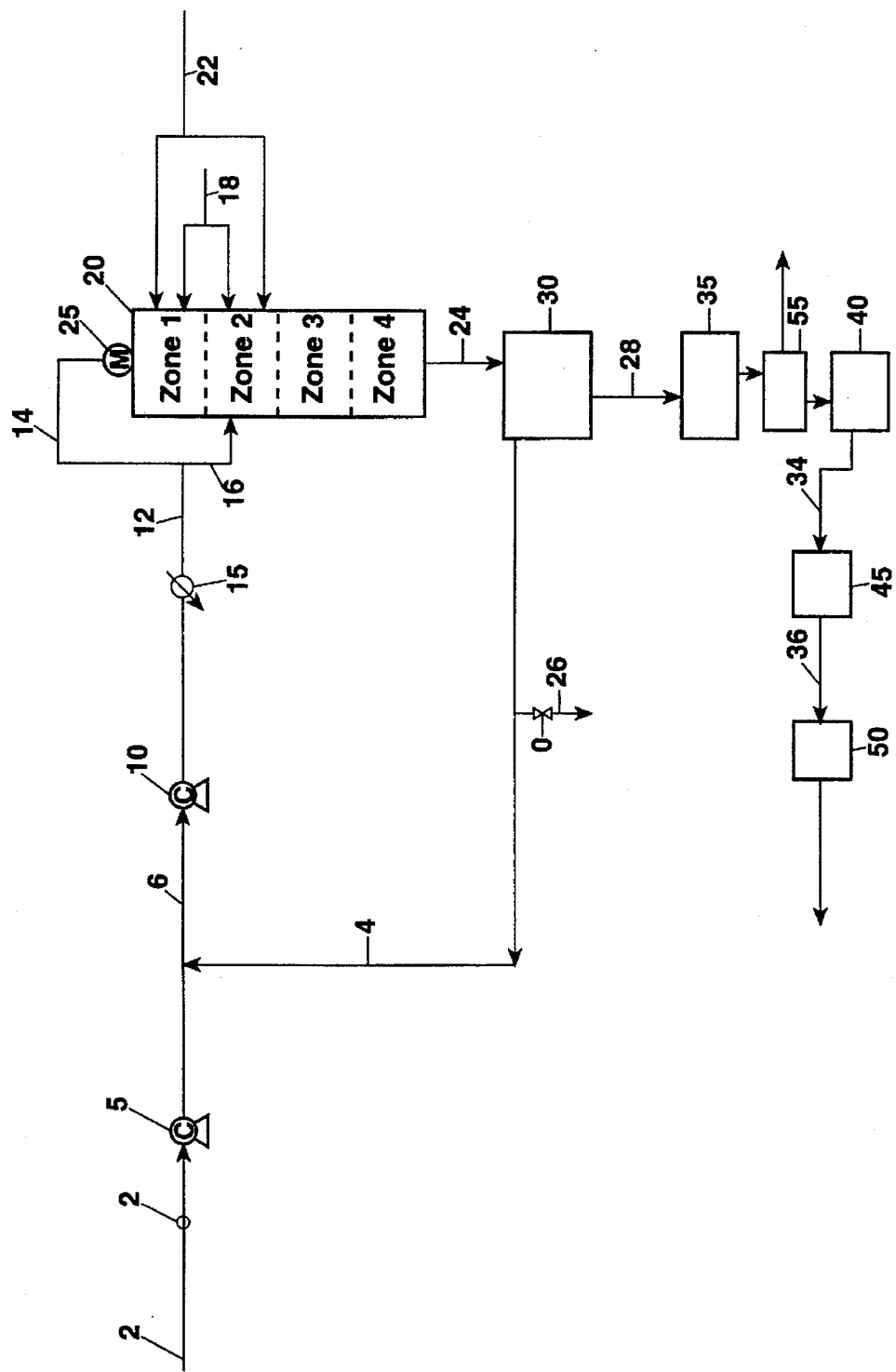
FIG. 1 is a schematic diagram of a preferred embodiment of the process of the present invention.

According to one embodiment of the present invention, a high-pressure process is provided for producing ethylene-alkyl acrylate copolymers. As used herein, the term "ethylene-alkyl acrylate copolymer" or "copolymer of ethylene and alkyl acrylate" refers to copolymers of ethylene and methacrylic or acrylic esters of linear, branched or cyclic alcohols having 1–28 carbon atoms. Mixtures of these esters may also be used to prepare the copolymers of this invention. In addition, minor amounts of other monomers may be used, provided they do not materially affect the properties of the copolymers of this invention. The alkyl acrylate comonomers are exemplified by methyl acrylate, ethyl acrylate, butyl acrylate, and methyl methacrylate, and the ethylene-alkyl acrylate copolymers are exemplified by ethylene-methyl acrylate copolymer ("EMA"), ethylene-ethyl acrylate copolymer ("EEA"), ethylene-butyl acrylate copolymer ("EBA"), and ethylene-methyl methacrylate copolymer.

The ethylene-alkyl acrylate copolymers of this invention typically contain about 5–50 wt % alkyl acrylate and about 95–50 wt % ethylene, preferably about 10–40 wt % alkyl acrylate and about 90–60 wt % ethylene, and more preferably about 15–40 wt % alkyl acrylate and about 85–60 wt % ethylene. A particularly preferred copolymer contains about 20 wt % alkyl acrylate and about 80 wt % ethylene. All weight percentages are based on the combined weight of alkyl acrylate and ethylene.

I. PROCESS OF MAKING THE COPOLYMERS OF THIS INVENTION

As used herein, the following terms have the following meanings:

1. "A" is used herein to denote the total amount by weight of alkyl acrylate fed to the reactor.
2. "$A_1$" is used to denote the portion of the amount A which is introduced into a first reaction zone in said reactor.
3. "E" is used to denote the total amount by weight ethylene fed to the reactor.
4. "$E_1$" is used to denote the portion of the amount E which is introduced into the first reaction zone.

One appropriate measure of these amounts is pounds (mass).

5. "A first reaction zone" refers to the first reaction zone in a multi-zone autoclave polymerization reactor in which 1) the weight ratio of alkyl acrylate to ethylene introduced into that zone is at least 10% greater than or at least 10% less than the weight ratio of the total alkyl acrylate to total ethylene fed to the multi-zone autoclave polymerization reactor; 2) at least 50% of the total alkyl acrylate A or at least 50% of the total ethylene E is present in said first reaction zone; and 3) an effective amount of initiator is introduced into said first reaction zone. The amounts of alkyl acrylate and ethylene introduced into a zone are the amounts fed to that zone through feed-pipes and the amounts entering that zone from reaction zones other than said first reaction zone (if any), regardless of whether the alkyl acrylate and ethylene were reacted in the other zones. Preferably, the amounts of alkyl acrylate and ethylene introduced into a zone are the amounts fed to that zone through feed-pipes and the amounts entering that zone from the reaction zone immediately upstream of said zone.

6. "Reaction zone" refers to an area within a single reaction vessel in which polymerization of the ethylene and/or alkyl acrylate takes place. Typically, the "reaction zone" is a portion of a single reaction vessel which is segregated from other areas of the same reaction vessel. This segregation can be accomplished by physical barriers (such as baffles and the like), or other suitable means (such as the mixing patterns within the reaction vessel). As used herein, the term "reaction zone" also includes areas in separate, multiple reaction vessels where polymerization occurs.

The process can best be understood in conjunction with FIG. 1 which illustrates, in schematic form, a process for the manufacture and recovery of ethylene-alkyl acrylate copolymers. Referring to FIG. 1, this process starts by feeding ethylene gas through line 2 via primary compressor 5. The gas exits the compressor into line 6.

Line 6 is also the suction line for secondary compressor 10. The ethylene feed is compressed by secondary compressor 10 and discharges into line 12. The high-pressure feed is cooled in cooler 15. The ethylene feed stream is then fed to reactor 20.

Although multiple reactors may be used, in one preferred embodiment, the process uses a multi-zoned, high-pressure autoclave reactor. A 4-zone reaction system is preferred and is exemplified in FIG. 1, although additional zones, such as six, or fewer zones, such as two zones, can be used.

Preferably, the ethylene is fed into the top of the reactor through line 14 and into Zone 1. The reactor zones are numbered from top to bottom. Alkyl acrylate monomer is fed to the reactor through line 22 in an overall amount by weight of A pounds, and is divided to feed selected zones. In one embodiment, Zone 1 is fed $A_1$ pounds, and Zone 2 is fed $(A-A_1)$ pounds.

In a continuous process like the four-zone autoclave reactor pictured in FIG. 1, the total feed of alkyl acrylate relative to the total ethylene feed determines the alkyl acrylate content of the final copolymer. A copolymer containing 20 wt % alkyl acrylate has a smaller total feed ratio of alkyl acrylate to ethylene (A/E) than a copolymer containing 30 wt % alkyl acrylate. To achieve the desired product, an overall A/E feed ratio is chosen and generally maintained throughout a production run, although the ratio A/E can be varied over time to produce copolymers containing different weight percentages of alkyl acrylate.

As used herein, the term "conventional ethylene-alkyl acrylate copolymers" refers to those ethylene-alkyl acrylate copolymers which are made by dividing the ethylene monomer and alkyl acrylate monomer equally among the reactor zones to which monomers are fed. Thus, for a conventional ethylene-alkyl acrylate copolymer requiring overall that A amount by weight of alkyl acrylate monomer be fed to the reactor and E amount by weight of ethylene monomer be fed to the reactor, and for a four-zone reactor with two zones chosen for feeding reactants into the reactor, as illustrated in FIG. 1, the ratio of the amount, $A_1$, of alkyl acrylate in a first reaction zone, to the amount, $E_1$, of ethylene in said first reaction zone is equal to the ratio of the amount of alkyl acrylate fed to a second reaction zone, $A-A_1$, to the amount of ethylene fed to a second reaction zone, $E-E_1$, (i.e., the ratio $(A-A_1)/(E-E_1)$), and is equal to the ratio of the overall amount of alkyl acrylate A to the overall amount of ethylene E (i.e., the ratio A/E).

It has quite surprisingly been discovered that the ratio of the amount by weight of alkyl acrylate monomer to the amount by weight of ethylene monomer in a first reaction zone ($A_1/E_1$) relative to the ratio of the overall amount by weight of alkyl acrylate monomer to the overall amount by weight of ethylene monomer (A/E) is critical to obtain the improved properties of the ethylene-alkyl acrylate copolymer of this invention. It has unexpectedly been found that where the ratio $A_1/E_1$ is at least ten percent greater than the overall ratio A/E or is at least ten percent less than the overall ratio A/E required to make the ethylene-alkyl acrylate copolymer, the melt-point temperature of the copolymer is significantly increased over conventional copolymers having the same alkyl acrylate content.

In one embodiment of the invention, the ratio of alkyl acrylate to ethylene in a first reaction zone is at least ten percent less than the overall ratio of alkyl acrylate to ethylene for the reactor. Preferably, the ratio is at least 25% less than and more preferably is 50% or even 100% less than the overall ratio of alkyl acrylate to ethylene for the reactor. In one particularly preferred embodiment, the ratio of alkyl acrylate to ethylene in a first reaction zone is zero. The ethylene, E, fed to the 4-zone reactor 20 of FIG. 1 is divided so that the amount of ethylene in Zone 1, fed through line 14, is between 0 and 100% of E, preferably is about 25% to 75% of E, and more preferably is 50% of E. About 75% to 0% of E, preferably 0% of E, is fed to Zone 2. Any remaining portion of E, preferably 50% of E, is fed to Zone 3. The amount of alkyl acrylate in Zone 1 is 0 to about 50% of A, and preferably is 50% of A. An effective amount of initiator is also preferably introduced into Zone 1. About 50 to 0% of A, preferably 0%, is fed into Zone 2, which in this preferred embodiment is "a first reaction zone" as defined above. Any remaining amount of alkyl acrylate and initiator is fed to the subsequent reaction zones, which in a further preferred embodiment yields 50% of A being fed to Zone 3. The temperature in Zone 1 is preferably about 300° F. to 450° F., and more preferably is about 325° F. to 425° F. The reaction zone pressure preferably is about 10,000 to about 40,000 psig, more preferably about 15,000 to about 35,000 psig, and most preferably is about 20,000 to about 30,000 psig.

In another embodiment of the invention, the ratio of alkyl acrylate to ethylene in a first reaction zone is at least ten percent greater than the overall ratio of alkyl acrylate to ethylene for the reactor. Preferably, the ratio is at least 25% greater and more preferably is 50% or even 100% greater than the overall ratio of alkyl acrylate to ethylene for the reactor. In one particularly preferred embodiment, the ratio is 300% greater than (i.e., 4 times) the overall ratio of alkyl acrylate to ethylene for the reactor. Preferably, the ethylene, E, fed to the 4-zone reactor 20 of FIG. 1 is divided so that the amount of ethylene in Zone 1, fed through line 14, is about 25% to 75% of E, preferably is 25 to 50% of E, and more preferably is about 25% of E. About 75% to 25%, and more preferably about half, of the ethylene monomer is fed into Zone 2 through line 16. Any remaining portion of E is fed to subsequent reaction zones, and preferably 25% of E is fed to Zone 3. The amount of alkyl acrylate in Zone 1 is about 100% to 25% of A, and preferably is 100% of A (in this preferred case where all of the alkyl acrylate is fed to Zone 1, Zone 1 is "a first reaction zone" as defined above). The amount of alkyl acrylate fed to Zone 2 is 0% to about 75% of A, and preferably is 0%. Any remaining alkyl acrylate is fed to subsequent reaction zones, and preferably is fed to Zone 3.

It has also unexpectedly been found that where the ratio $A_1/E_1$ is at least ten percent greater than the overall ratio A/E, the adhesion of a film of the copolymer to a film of a substrate such as another polymer increases. For the 4-zone autoclave reactor of FIG. 1, the preferred process described in the paragraph immediately above provides ethylene-alkyl acrylate copolymers having substantially increased adhesion to polyester or polypropylene films, including oriented polyester or oriented polypropylene films.

A free radical initiator is preferably used to catalyze the polymerization. The initiator can be added into any zones where polymerization is desired. The initiator preferably is fed into at least the first reaction zone in a sufficient amount and rate whereby the temperature of the liquid phase in the reaction zone is controlled in the range specified above. For example, in the process of FIG. 1, the initiator can be added into Zone 1 or to both Zone 1 and Zone 2 through line 18. Optionally, the initiator can be added to Zones 3 and 4 as well.

The initiator may be added to the reaction zone(s) in any suitable manner. Generally, it is dissolved in a suitable solvent, typically a hydrocarbon, and injected into the zone(s). Normally, the initiator and alkyl acrylate are simultaneously injected into the reaction zone(s), though this is not essential. In a preferred embodiment, the initiator and alkyl acrylate are simultaneously injected into the reaction zone via concentric tubes, one carrying the initiator and the other carrying the alkyl acrylate.

Examples of initiators useful in the practice of this invention include, but are not limited to, peroxides such as lauroyl peroxide, t-butyl perbenzoate, t-butyl peroxypivalate and di-t-butyl peroxide. A preferred initiator is t-butyl peroxypivalate. Typically, the initiator is dissolved in a liquid hydrocarbon such as hexane or mineral oil.

In preparing the ethylene-alkyl acrylate copolymers of this invention, it is desirable to add an oxygen scavenging compound to the reaction mixture. Phenolic compounds are useful in this regard. These phenolic compounds include 2,6-di-t-butyl-4-methylphenol (BHT) and 2,6-di-t-butyl-4-ethylphenol (BHEB). These compounds are well known in the art; see U.S. Pat. No. 3,941,747, issued Mar. 2, 1976 to Roth et al., which is incorporated herein by reference. A preferred compound is BHEB. The addition of the oxygen scavenging compound is at a rate such that the concentration of the compound is preferably 0.01 to 0.5, more preferably 0.05 to 0.10 wt %, of the total copolymer produced.

The reaction mixture is agitated within said first reaction zone to produce both radial and longitudinal mixing. Preferably a substantially uniform reaction temperature is maintained.

The reaction mixture proceeds from the first reaction zone into a second reaction zone. The reaction mixture in the second zone preferably is agitated to produce good radial and longitudinal mixing. In one preferred embodiment, the remaining alkyl acrylate monomer, ethylene and additional free radical initiator are introduced into the second reaction zone. Also preferably, the three components are added separately and concurrently into the second reaction zone. The initiator is fed into the second reaction zone in a sufficient amount and rate whereby the temperature of the liquid phase in the final reaction zone is controlled to about 350° F. to 450° F. more preferably to about 350° F. to 425° F., and most preferably 375° F. to 425° F.

Preferably, there are one or more reaction zones after the second reaction zone which are used to further polymerize the ethylene and alkyl acrylate monomers. Referring to FIG. 1, the reaction mixture is removed from the end of Zone 2

(the second reaction zone, in this case) and introduced into two additional reaction zones, where the mixture is agitated to produce both radial and end-to-end mixing.

The reaction mixture is removed from the final reaction zone. The product, which contains ethylene-alkyl acrylate copolymer, unreacted ethylene and other impurities, leaves reactor 20 of FIG. 1 and is transferred, via pressure differential, through line 24 to separator 30. In separator 30, the molten copolymer is separated from the unreacted ethylene, and the ethylene is recycled back, via line 4, to the suction of secondary compressor 10. A voluntary purge is removed from the recycle, via line 26, in a sufficient amount to obtain the desired purity of the ethylene returning to secondary compressor 10. Impurities that need to be removed include telogens, which reduce the molecular weight of the polymer, as well as other process compounds affecting the purity of the recycled ethylene.

The molten polymer leaves separator 30 and is transferred, via line 28, to hopper 35. Transfer is accomplished by a pressure differential between separator 30 and hopper 35.

In the preparation of polymers, as in bulk and solution polymerization or by other standard methods, considerable amounts of starting materials, such as unreacted monomer or solvent, remain admixed or entrained in the polymer product. This contamination of polymer is undesirable because of well known adverse effects on polymer properties. Since the contaminants in most cases are volatile relative to their polymeric hosts, they are removed from the condensed phase (polymer) by evaporation into a contiguous gas phase. Such separation processes are commonly referred to as devolatilization ("DV"). The process of devolatilization in DV zone 55 of FIG. 1 is preferably used to prevent these volatile components from contaminating the copolymer product. This is done before the product is fed to gear pump and pelletizer 40.

In one embodiment of the invention, devolatilization is accomplished by venting the volatile components prior to extrusion. However, devolatilization is well known in the art, and other methods may be used or adapted. See "Encyclopedia of Polymer Science & Engineering", 2d Ed., Vol. 4, pp. 745–51 (1986), which is incorporated herein by reference.

The ethylene-alkyl acrylate copolymers of the present invention are typically produced in the form of pellets. If the surface of the pelletized ethylene-alkyl acrylate copolymer tends to be sticky, it is preferable to coat or dust the pellets to prevent agglomeration. Coating agents selected from the group consisting of silicas, talc, and powdered polyolefins are used. Preferably, talc or powdered polyethylene is used. Preferably, integral to the coating step, the pellets are classified according to their size for packaging.

II. IMPROVED PROPERTIES OF THE COPOLYMERS AND THEIR USES

There are several improved properties of the copolymers of this invention that are particularly advantageous. These include an increased melt-point temperature and enhanced adhesion to substrates.

A. HIGHER MELT-POINT TEMPERATURES

The copolymers of this invention have surprisingly higher melt-point temperatures than ethylene-alkyl acrylate copolymers prepared using conventional methods. As can be seen from the data of Table 1, the melt-point temperatures of the ethylene-alkyl acrylate copolymers of the present invention are at least about 6° F. higher than the melt-point temperatures of conventional ethylene-alkyl acrylate copolymers having a corresponding alkyl acrylate content. Generally, these melt-point temperature differences increase as the alkyl acrylate content of the copolymers increases.

The lowest melt-point temperature for the ethylene-methyl acrylate copolymers of this invention can be expressed in terms of the alkyl acrylate content of the copolymer, denoted by "Y" where Y is greater than ten:

$$\text{temperature(deg } F) = 248 - 3.1Y \qquad \text{Eq. 1}$$

For EBA copolymer of this invention, the relationship of the lowest melt-point temperature to BA content, denoted by "Z" where Z is greater than 10, is:

$$\text{temperature(deg } F) = 240 - 2.3Z \qquad \text{Eq. 2}$$

Preferably, Y and Z are at least about 15, and more preferably are at least about 20.

Higher melt-point temperatures are an advantage in applications where higher end-use temperatures are required or where the product is potentially subject to high temperatures. For example, EMA copolymer and EBA copolymer are used to fabricate gaskets and plastic valve components. These articles may be subject to high temperatures during shipping, storage or use. Less shape distortion would occur at these temperatures using the high-melt-point copolymers of this invention. Indeed, the higher melt-point products of this invention provide for a broader range of useful operating temperatures and thereby increase the number of potential applications for ethylene-alkyl acrylate copolymers. EMA and EBA copolymers are also used as films or layers in single-layer or multi-layer constructions, such as food wrap.

When making films comprising the copolymer of this invention, it is often desirable to add anti-block and slip additives to aid with processing and handling of the films. Slip additives are preferably added in the range of about 0.1 to about 0.5 wt % of the polymer. Useful slip additives include high molecular weight paraffinic amides, such as stearamide, oleamide and erucamide. Anti-block additives are preferably added in the range of about 0.3 to about 1.5 wt % of the polymer. They have very small particle size and are preferably natural or synthetic silicas, diatomaceous earths and talc.

B. IMPROVED ADHESIVE STRENGTH

In one preferred embodiment, copolymers of this invention are quite useful as adhesives, especially in extrudable film applications such as multi-layer extrusions. Such applications could include, for example, automotive door panels. Here, the adhesive must be stable to a temperature of about 180° F. to withstand the heat of a car interior on a hot day.

In one embodiment of this invention, the adhesive strength of the copolymer remains substantially the same as a conventional copolymer, even though the melt-point temperature has increased substantially. Typically, the adhesive strength of this type of copolymer increases less than 20%, and preferably less than 10%, over the adhesive strength of a conventional copolymer. The melt-point temperature increases by at least about 6° F. over a conventional copolymer having about the same melt-index.

In another embodiment of this invention, both the melt-point temperature and the adhesive strength of the copolymer increase substantially. In this embodiment, the melt-point temperature increases by at least 6° F. and the adhesive strength increases by at least about 20%, preferably by about 50%, and more preferably by about 100%, over a conventional copolymer.

In a further embodiment of this invention, the adhesive strength of the copolymer increases substantially, while the melt-point temperature remains substantially the same as a conventional copolymer. In this embodiment, the melt-point temperature of the copolymer is less than 6° F. above the melt-point of a conventional copolymer, but the adhesive strength increases by at least about 20%, preferably by about 50%, and more preferably by about 100%, over a conventional copolymer.

C. IMPROVED POLYMER BLENDS

The ethylene-alkyl acrylate copolymers of the present invention are useful in preparing polymer blends which, in turn, are useful in making films. For example, the ethylene-alkyl acrylate copolymers of this invention can be blended with a polyolefin such as polyethylene by melt blending techniques to produce a composition which is useful in preparing films. As used herein, the term "polyolefin" refers to homopolymers and copolymers of alpha-olefins having from 2 to about 8 carbon atoms, such as high density polyethylene, low density polyethylene, linear low density polyethylene, and polypropylene. Optical properties, melt-point temperature, and adhesiveness of these blends often improve as a result of blending copolymer of this invention with other polymers.

The high melt-point copolymers of this invention are particularly useful in blends with other polymeric materials. Here, the melt-point of the ethylene-alkyl acrylate copolymer can be chosen to better match the other blend component(s) and the requirements of the desired application. Again, these blends could be used in applications requiring higher temperatures.

In sum, the improved melt-point temperature and/or adhesive strength allows use of the copolymers of this invention where previous ethylene-alkyl acrylate copolymers could not be used due to their lower melt-point temperatures and/or adhesive strength.

III. DERIVATIVES OF THE COPOLYMERS OF THIS INVENTION

Derivatives of the copolymers of this invention as described below also possess improved properties, such as higher melt-point temperature and/or higher adhesion. This will permit use of these derivatives in a wider range of applications; for example, derivatives may be used in multilayer extrusions or elsewhere where adhesion is desired, e.g., where gas barrier films are adhered to rigid plastics or other materials which are to be used in higher temperature applications. A variety of derivatives may be produced using methods well known in the art.

The polymers of the present invention can be partially or totally saponified to produce ionomers by reacting an ethylene-alkyl acrylate copolymer of this invention and an aqueous solution of an inorganic alkali metal base at a temperature sufficient for saponification to occur.

Among other factors, the present invention is based on the discovery that (1) ionomers made from the ethylene-alkyl acrylate copolymers of this invention have higher melt-points than ionomers made from conventional ethylene-alkyl acrylate copolymers, (2) the ionomers of this invention have higher melt strength than ionomers made from conventional ethylene-alkyl acrylate copolymers which results in better processability at higher temperatures, e.g., they are stronger when molten, (3) the ionomers of this invention provide good adhesion to metal, e.g., aluminum, foils, and (3) films made from ionomers of this invention have improved clarity. In addition, when the ionomers of this invention and ionomers made from conventional ethylene-alkyl acrylate copolymers are formed into strands and stretched, the ionomers of this invention stay nearly transparent, do not whiten and have a higher tensile strength than the unstretched strand, whereas the stretched strands made from conventional ionomers turn white and "foamy" and become weaker.

Ethylene-sodium acrylate-methyl acrylate terpolymers (ionomers) made from conventional, ethylene-methyl acrylate copolymers having random acrylate unit sequence distribution are heterogeneous due to the limited capability of the randomly dispersed methyl acrylate groups to homogenize the sodium acrylate aggregates by solvation. These conventional terpolymers have exhibited two-phase morphology in which a sodium-rich phase is dispersed in a sodium-poor matrix. The aggregates are usually larger than one micron in diameter.

As a result, films fabricated from these conventional terpolymers have poor optical properties, such as high haze and low gloss values. The heterogeneity also causes anisotropy in fabricated articles in the sense that films or extrudates turn opaque as they are stretched. The inherent structure and morphology of these conventional terpolymers with randomly distributed acrylate groups result in low values of the ultimately achievable performance properties.

On the other hand, ethylene-sodium acrylate-methyl acrylate terpolymers (ionomers) made from the ethylene-methyl acrylate copolymers of this invention have a unique acrylate comonomer sequence distribution in comparison with the conventional terpolymers. A higher percentage of acrylate groups in the ionomers of this invention is distributed in blocks, i.e., methyl acrylate groups are bonded to each other. The solubilization of the sodium acrylate groups in the terpolymers of this invention is thus provided by the localized high polarity region in which one or more of the blocks of methyl acrylate are located. This type of structural character produces local regions of high polarity which efficiently solubilize the ionic clusters of sodium acrylate to form much smaller clusters which can not even be observed by Scanning Electron Microscopy (SEM).

The smaller size of the ionic clusters of the ionomers of the present invention causes the polymers to have a homogeneous, one-phase morphology. This dispersion of the smaller size but larger number of ionic groups significantly increases the interfacial area between the ionic clusters and the matrix Versus the conventional terpolymers. This, in turn, produces polymers with lower melt flow rates.

As used herein, the term "inorganic alkali metal base" refers to basic compounds which contain a metal from Group I of the Periodic Table as a cation, and an inorganic anion. For the purposes of this invention, a carbonate anion is considered to be inorganic. Examples of the inorganic alkali metal bases useful in preparing saponified products include, but are not limited to, alkali metal hydroxides (such as NaOH, KOH and LiOH), alkali metal oxides (such as $Na_2O$, $K_2O$ and $Li_2O$) and alkali metal carbonates (such as $Na_2CO_3$, $K_2CO_3$ and $Li_2CO_3$). A preferred metal base is NaOH.

In a preferred embodiment, the saponification reaction is carried out at relatively high temperatures so that the ethylene-alkyl acrylate copolymer will undergo a phase change. As used herein, the phrase "undergo a phase change" means that the ethylene-alkyl acrylate copolymer (which is a solid at room temperature) has been heated at least to the point where it is readily deformed. Generally, this will mean that the copolymer has been heated until it is converted to a molten or fluid state. In general, the reaction temperature may be from about 180° C. to about 300° C. Higher reaction temperatures may be used, though discoloration and/or degradation of the polymer may occur. Likewise, lower temperatures may be used, but these lower temperatures may require excessively long reaction times. Preferably, the reaction temperature will be from about 200° C. to about 280° C.

This preferred saponification process can be conducted in any suitable mixing device such as a Brabender Plasticorder, a roll mill, a single or multiple screw extruder or any other of the well known mechanical mixing equipment normally used in the mixing, compounding, processing or fabrication of low or high molecular weight thermoplastic, elastomeric or thermosetting polymers or mixtures thereof. An extruder having one or more ports is a particularly desirable reaction vessel, although it is by no means necessary insofar as the saponification reaction can be done in other reaction vessels. Suitable extruders are described in U.S. Pat. No. 4,857,600, issued Aug. 15, 1989 to Gross et al., which is incorporated hereinby reference. The saponification reaction preferably occurs in a reactive extruder, where the ethylene-alkyl acrylate copolymer can be injected molten or be melted in situ, and where the alkali metal base can be added into the first and/or subsequent reaction zones.

Preferably, the residence time for the reaction mixture in an extruder will generally be about 0.1 to about 30 minutes, the particular residence time being chosen so that the desired level of saponification is achieved. Of course, the residence time may vary depending upon the particular reaction conditions employed, the reaction temperature, throughput, extruder RPM, and the like.

The products of the reaction are an alkanol (the alkyl group of which comes from the alkyl acrylate comonomer) and a terpolymer of ethylene, alkyl acrylate, and an alkali metal salt of acrylic acid, assuming, that is, that less than 100% of the alkyl acrylate is saponified. The degree of saponification can be varied, and is controlled by the amount of inorganic alkali metal base used and reaction conditions. While essentially all of the acrylate groups on the copolymer can be saponified, this generally results in a highly cross-linked, extremely tough material which may be difficult to process. Generally, therefore, about 2% to about 90%, preferably about 5% to about 70%, more preferably about 10% to about 60% of the acrylate groups on the copolymer are saponified. The resulting terpolymer has some remaining ester groups, which desirably function as a plasticizer.

After reaction completion, any water and by-product alkanol remaining in the reaction product can be removed, for example, by devolatilization. Also, any unreacted inorganic alkali metal base remaining in the reaction product will usually be neutralized.

EXAMPLES

The following examples illustrate particular embodiments of the invention and do not limit the scope of the invention disclosed above.

EXAMPLE 1

EMA COPOLYMER PREPARATION HAVING 20 WEIGHT PERCENT METHYL ACRYLATE

A conventional EMA copolymer and EMA copolymer of this invention were prepared in a 4-zone autoclave reactor, as illustrated in FIG. 1. The ethylene and methyl acrylate ("MA") were fed into the reactor so that varying proportions of MA were fed into Zone 1.

Ethylene was charged to the reactor at a rate of 12,000 lbs./hr., with the percentages fed to each zone being listed in Table 1 below. The ethylene charged to the reactor had a purity of about 99.9% and contained less than 10 ppm of oxygen.

MA was fed to the reactor at an overall rate of about 370 lb./min. The percent of MA injected into the reactor zones was varied as shown in Table 1. The ratio of the quantity $A_1/E_1$ to the quantity $A_1/E_1$ is also shown in Table 1 below for the experimental feed splits. The copolymers of this invention were produced when the ratio $A_1/E_1$ was at least about 10% greater than or at least about 10% less than the overall ratio for the reactor, A/E.

The MA contained about 50 ppm methyl ethyl hydroquinone, a polymerization inhibitor, and had an oxygen content of less than 20 ppm. The initiator, tertiary butyl peroxy pivalate, was dissolved in a hydrocarbon carrier and introduced into the first and second reaction zones at a rate of 4.8 lbs./hr., which is 380 ppm based upon the weight of monomers charged. The polymerization was conducted at pressures and temperatures typically used to prepare ethylene-alkyl acrylate copolymers. Good mixing was provided in each zone via internal agitation. Butylated hydroxyethylbenzene (BHEB) was added at a rate to maintain 650 ppm based on polymer produced.

The reaction mixture was discharged from the reactor as molten polymer. Unreacted ethylene was separated and recycled. Using a gear pump, the EMA copolymer was extruded through a die having a series of ⅛ " holes into a water bath at 90° F. The resulting strands were pelletized and dried. The ethylene-methyl acrylate copolymer that was obtained contained approximately 20–23 wt % methyl acrylate. Properties of the copolymers so obtained are summarized in Table 1 below.

Melt-point temperatures for the copolymers were measured by using a Perkin-Elmer Differential Scanning Calorimeter DSC-7 and by utilizing standard methods well known in the art.

TABLE 1

| Run Number | Wt. % and Type of Comonomer in Ethylene Copolymer[2] | Melt-point Temp. °F. | Melt-index (g/10 min.) | % MA/% ETHYLENE FED TO ZONE 1[4] | % MA/% ETHYLENE FED TO ZONE 2[4] | % MA/% ETHYLENE FED TO ZONE 3[4] | % MA/% ETHYLENE FED TO ZONE 4[4] | % of Methyl Acrylate Introduced into a First Reaction Zone | Ratio of $A_1/E_1$ to A/E in a first reaction zone |
|---|---|---|---|---|---|---|---|---|---|
| A[1] | 22.5 MA | 181 | 6.2 | 50/50 | 50/50 | 0/0 | 0/0 | 50 | 1.0 |
| B[1] | 20.7 MA | 185 | 1.9 | 50/50 | 50/50 | 0/0 | 0/0 | 50 | 1.0 |
| C | 21.3 MA | 182 | 5.6 | 25/50 | 25/50 | 50/0 | 0/0 | 25 | 0.5 |
| 1 | 21.5 MA | 188 | 5.5 | 0/50 | 50/50 | 50/0 | 0/0 | 0 | 0.0 |
| 2 | 21.3 MA | 191 | 5.8 | 50/50 | 0/50 | 50/0 | 0/0 | 50[3] | 0.5 |
| 3 | 22 MA | 198 | 6.7 | 100/50 | 0/50 | 0/0 | 0/0 | 100 | 2.0 |
| 4 | 20.6 MA | 201 | 2.0 | 100/50 | 0/50 | 0/0 | 0/0 | 100 | 2.0 |
| 5 | 20.3 MA | 201 | 1.7 | 50/25 | 50/50 | 0/25 | 0/0 | 50 | 2.0 |
| 6 | 22 MA | 207 | 6.6 | 100/25 | 0/50 | 0/25 | 0/0 | 100 | 4.0 |
| D[1] | 21 BA | 190 | — | 50/50 | 50/50 | 0/0 | 0/0 | 50 | 1.0 |
| 7 | 22 BA | 203 | — | 100/50 | 0/50 | 0/0 | 0/0 | 100 | 2.0 |

[1]Experiments A and B are conventional copolymers and are comparative experiments.
[2]MA - methyl acrylate; BA - butyl acrylate.
[3]Zone 2 is a first reaction zone for this example.
[4]Percentages of respective feed-rates of MA and ethylene fed to each zone. Melt index was determined using ASTM Method D-1238 @ 190° C. using a 2.16 kg mass.

EXAMPLE 2

MEASURING THE ALKYL ACRYLATE CONTENT OF THE COPOLYMER

The alkyl acrylate content of the copolymers made in Example 1 was measured by Fourier Transform Infra-Red spectroscopy (FT-IR). A sample of devolatilized copolymer was pressed into a thin film and scanned in the infrared region. The procedure used a Nicolet Model No. 510 FT-IR scanning infrared spectrophotometer. Seven to ten pellets (about ½ gram) or an appropriately-sized molded article were placed between two pieces of Mylar, approximately 4.75 mils thick. A 1" wide strip of Mylar was placed on top of the Mylar release sheet, so that it would cover the center of the sample. The Mylar "sandwich" was placed between 8"×8" platens of a 50,000 psig capacity Pasadena Hydraulics heated hydraulic press. The press was brought up to contact pressure (<1000 lbs.) at a temperature of about 350° F. The copolymer was allowed to melt (about 45 sec.). The press was then brought to 40,000 lbs. pressure, which was maintained for 10 sec. The pressure was released, and the samples were withdrawn. The sample was placed between two steel plates and allowed to cool (2 minutes).

As specified below, the areas of interest were measured, and a ratio of absorbance values was obtained. The weight percent of methyl acrylate was determined from FIG. 2, which is a correlation chart for absorbance ratio versus weight percent methyl acrylate in EMA copolymer. The weight percent of butyl acrylate was determined from FIG. 3, which is a correlation chart for absorbance ratio versus weight percent butyl acrylate in EBA copolymer.

Figure 2:
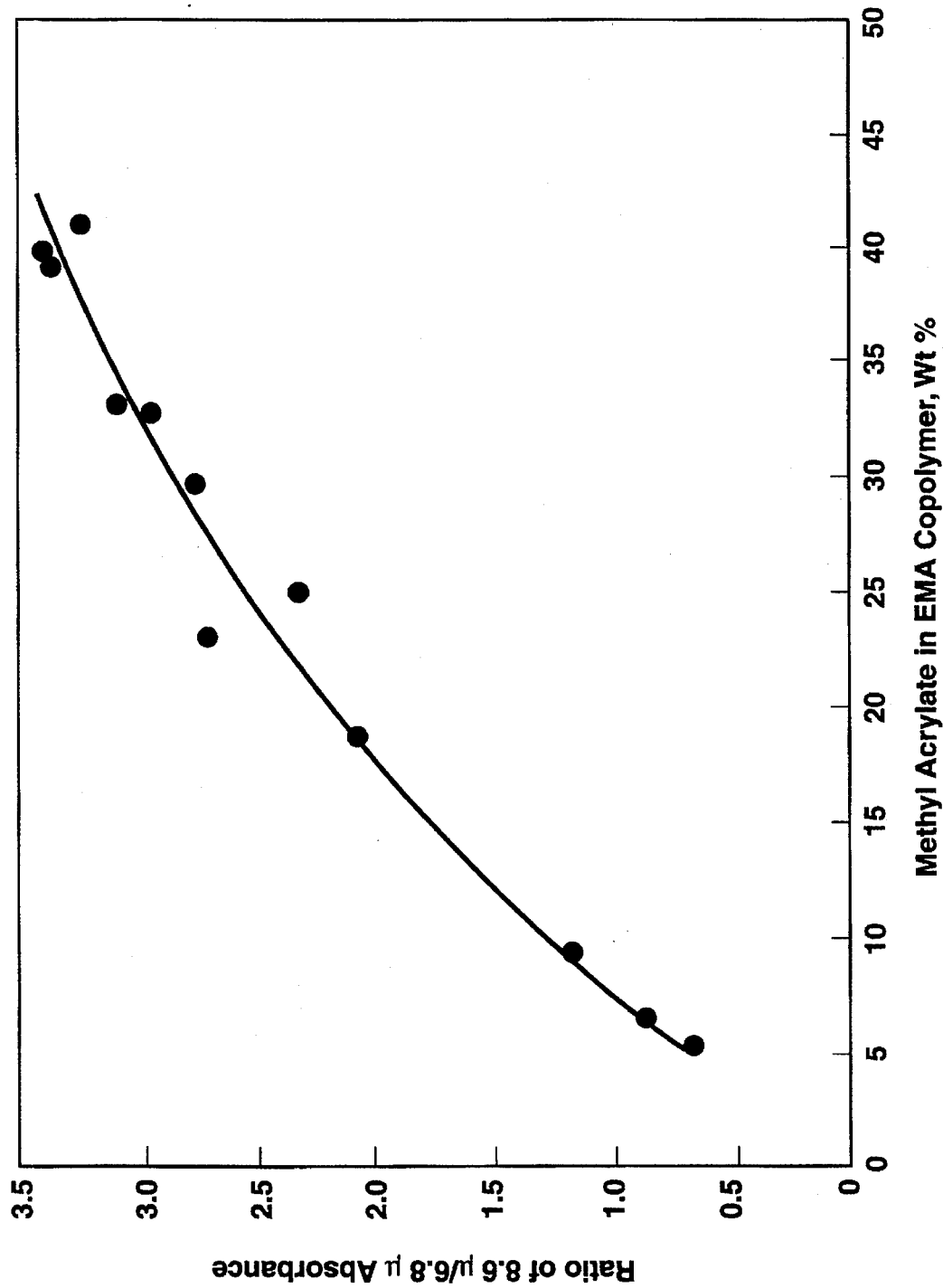
FIGS. 2 and 3 are correlation curves which give the relationship between the weight percent of methyl acrylate ("MA") in EMA copolymer (FIG. 2) or weight percent of butyl acrylate ("BA") in EBA copolymer (FIG. 3), and the ratio of 8.6μ to 6.8μ absorbances, as measured by Fourier Transform Infra-Red ("FT-IR") analysis.
Figure 3:
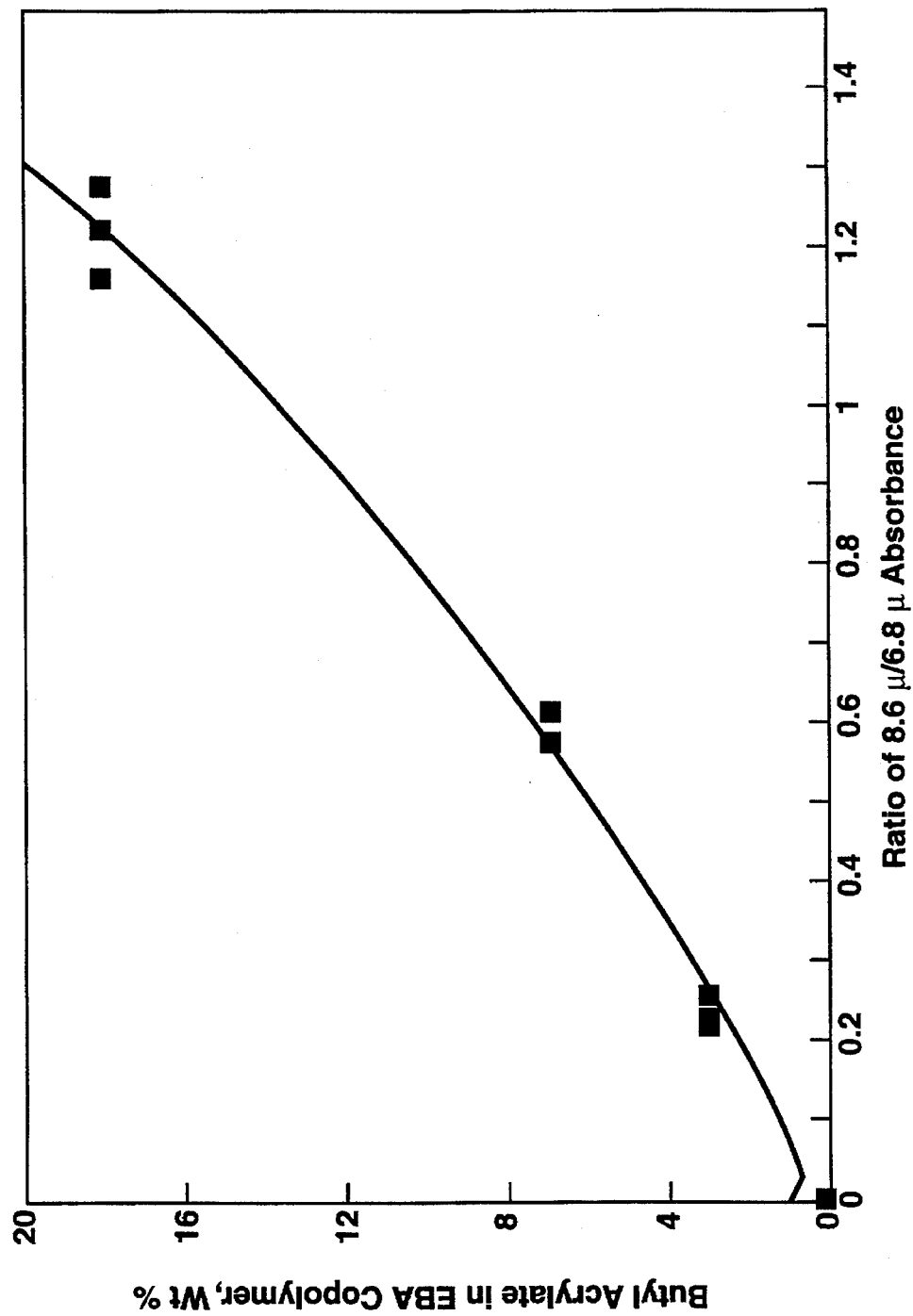

FIGS. 2 and 3 were derived from samples of conventional EMA copolymer and EBA copolymer which were assigned nominal values of MA or BA content, based upon information from the supplier of the samples. For other ethylene-alkyl acrylate copolymers, such standard techniques as NMR or elemental analysis can be used to develop correlation graphs similar to those of FIGS. 2 and 3.

The Mylar was carefully removed from the pressed sample. The center area of the pressed sample was mounted to a metal holder. It is important not to stretch the sample, since stretching can cause erroneous results.

A. DETERMINATION OF WEIGHT % MA IN EMA COPOLYMER

The mounted sample was placed in the infrared beam and scanned from 4000 to 400 cm$^{-1}$. The area from 1518.75–1707.42 cm$^1$ was integrated and labelled as the 6.8 µ absorbance. The area from 1323.93–1047.61 cm$^{-1}$ was integrated and labeled as the 8.6µ absorbance. The ratio of the 8.6µ absorbance to the 6.8µ absorbance was used to determine the MA content of the copolymers. Percent methyl acrylate was read directly from FIG. 2, which defines the relationship between the ratio of the 8.6µ absorbance to the 6.8µ absorbance and the weight percent methyl acrylate in EMA copolymer.

B. DETERMINATION OF WEIGHT % BA IN EBA COPOLYMER

The sample was formed and mounted as described above, and placed in the infrared beam and scanned from 4000 to 400 cm$^{-1}$. The area from 1501–1409 cm$^{-1}$ was integrated and labelled as the 6.8µ absorbance. The area from 1225–1046 cm$^{-1}$ was integrated and labeled as the 8.6µ absorbance.

The ratio of the 8.6µ absorbance to the 6.8µ absorbance was used to determine the BA content of the copolymers. Percent butyl acrylate was read directly from FIG. 3, which defines the relationship between the ratio of the 8.6µ absorbance to the 6.8µ absorbance and the weight percent butyl acrylate in EBA copolymer.

EXAMPLE 3

ADHESION OF COPOLYMERS OF THIS INVENTION TO POLYESTER

A comparative three-layer cast film consisting of a 2-mil layer of polyester (Eastman 7352), a 1-mil layer of EMA copolymer prepared by the conventional process and having a melt-index (MI) of about 2 (Comparative Run B of Table 1), and a second 2-mil layer of said polyester, respectively, were prepared on a Randcastle Mini-extruder. Three-layer cast films of this invention were prepared by substituting a 2 MI ethylene-methyl acrylate copolymer made by the process of this invention for the EMA copolymer made by the conventional process.

Figure 4:
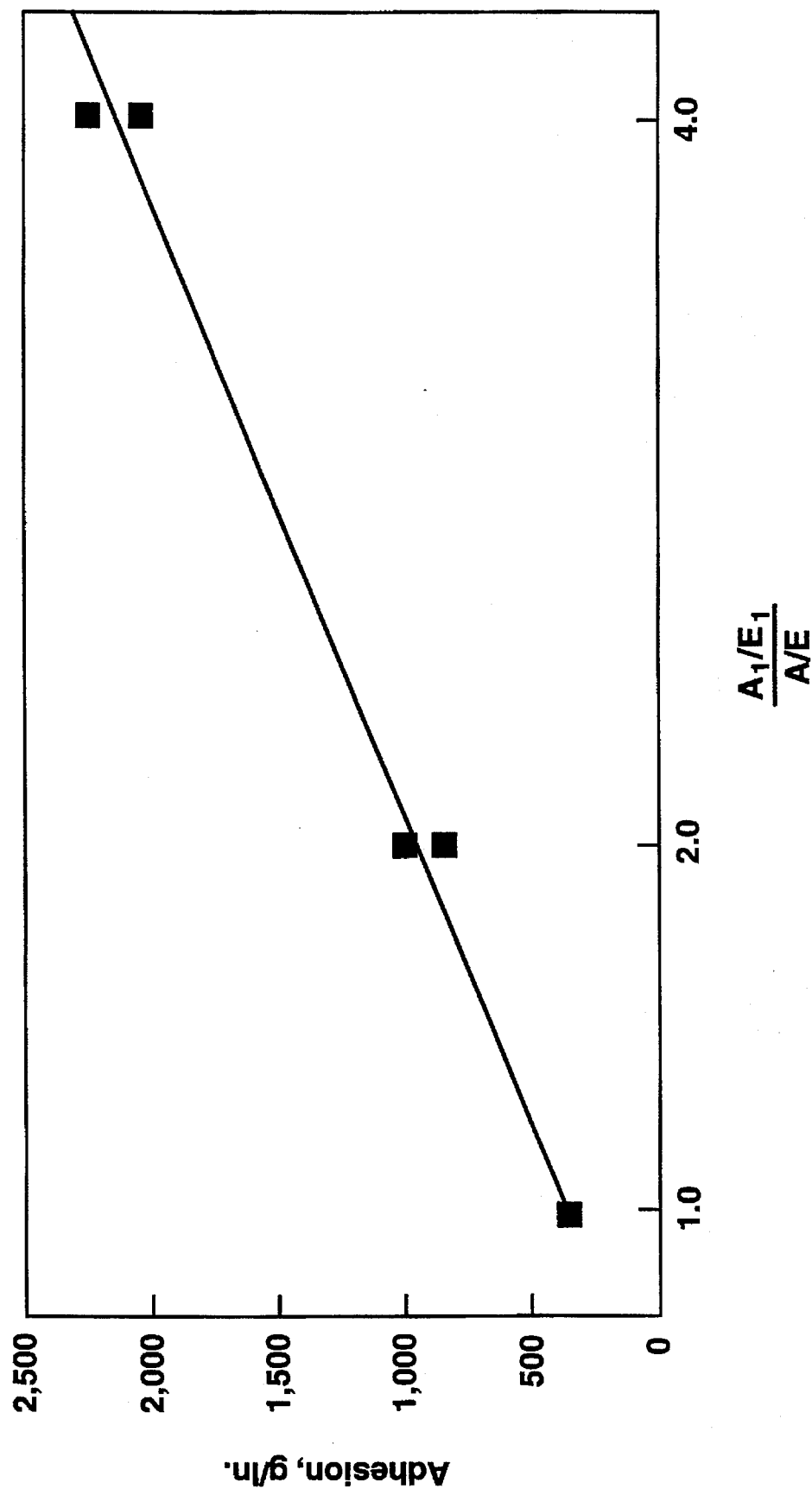
FIG. 4 is a graph of adhesive strength of EMA copolymer as a function of the ratio of alkyl acrylate to ethylene in a first reaction zone ($A_1/E_1$) to total alkyl acrylate to total ethylene (A/E) for the reactor.

Adhesion of the EMA copolymer layer to a polyester layer was measured using a Rheometrics RDA-700 analyzer and the method described in TAPPI Uniform Method 541, "Adhesion to Non-Porous Flexible Substrates," which is incorporated herein by reference in its entirety. The adhesion for the comparative film and for film of this invention are summarized in Table 2, and this data is shown graphically in FIG. 4.

TABLE 2

| RUN | EMA COPOLYMER PREPARED BY METHOD OF RUN NO. OF TABLE 1 | WT. % MA IN ETHYLENE COPOLYMER | ADHESION (gm/in.) |
|---|---|---|---|
| E[5] | COMPARATIVE RUN B | 20.7 | 360 |
| 8 | 3 | 20.6 | 860 |
| 9 | 4 | 20.3 | 1,000 |
| 10 | 5 | 22.3 | 2,040 |
| 11 | 5 | 21.7 | 2,250 |

[5]Experiment E is a conventional copolymer and is a comparative experiment.

These data show that the adhesion of ethylene-alkyl acrylate copolymer of this invention is substantially greater than the adhesion of conventional ethylene-alkyl acrylate copolymers to another polymeric substrate such as polyester.

EXAMPLE 4

ADHESION OF COPOLYMERS OF THIS INVENTION TO POLYPROPYLENE

EMA copolymer was prepared by the conventional process as summarized in Comparative Run A of Table 1 and had a MI of 20, a MA content of 20 wt. %, and a melting point of 181° F. A comparative two-layer cast film consisting of a 2.5-mil layer of polypropylene (Fina 3275) and a 2.5-mil layer of this EMA copolymer prepared by the conventional process were prepared on a Randcastle Mini-extruder.

EMA copolymer of this invention was prepared by the process as summarized in Run 3 of Table 1 and had a MI of 20, a MA content of 24 wt. %, and a melting point of 185° F. A two-layer cast film of this invention consisting of a 2.5-mil layer of said polypropylene and a 2.5-mil layer of this EMA copolymer was prepared on the Randcastle Mini-extruder.

The adhesive strength of each of these films was determined using the method of Example 3. The comparative film had an adhesive strength of about 815 gm/in., and the film of this invention had an adhesive strength of about 1790 gm/in.

EXAMPLE 5

ADHESION OF COPOLYMERS OF THIS INVENTION TO ORIENTED POLYPROPYLENE

EMA copolymer was prepared by the conventional process as summarized in Comparative Runs A and B of Table 1. A comparative three-layer cast film was made on a pilot-plant extrusion line operating at 300 ft/min. The film was made by extrusion coating a 0.75 mil substrate layer of oriented polypropylene (Mobil 410 LCM, available from Mobil Chemical Co.) which was exposed to corona discharge at 300 V with a 0.4-mil layer of this EMA copolymer and a 0.7-mil layer of an ethylene-acrylic acid ionomer (Surlyn 1652, available from DuPont de Nemoir) simultaneously at a melt temperature of 580° F., such that the EMA copolymer layer was sandwiched between the oriented polypropylene layer and the ionomer layer.

EMA copolymer of this invention was prepared by the process as summarized in Runs 3, 4 and 6 of Table 1. A three-layer cast film of this invention was prepared as above, substituting the EMA copolymer of this invention for the conventional EMA copolymer.

The adhesive strength of the oriented polypropylene and EMA copolymer of each of these films was determined using the method of Example 3. These measurements are summarized in Table 3.

Samples of these films were aged for 30 days at 80% relative humidity and at 72° F. The adhesive strengths of the films were determined using the method of Example 3. These measurements are also summarized in Table 3.

EXAMPLE 6

ADHESION OF COPOLYMERS OF THIS INVENTION TO ORIENTED POLYESTER

EMA copolymer was prepared by the conventional process as summarized in Comparative Runs A and B of Table 1. A comparative three-layer cast film was made on a pilot-plant extrusion line operating at 300 ft/min. The film was made by extrusion coating a 0.48-mil substrate layer of oriented polyester (Hoechst Hostaphan® 2DE1) which was exposed to corona discharge at 300 V with a 0.4-mil layer of this EMA copolymer and a 0.7-mil layer of a low-density polyethylene (Chevron PE Grade 1017, available from Chevron Chemical Co.) simultaneously at a melt temperature of 600° F., such that the EMA copolymer layer was sandwiched between the oriented polypropylene layer and the ionomer layer.

EMA copolymer of this invention was prepared by the process as summarized in Runs 3, 4 and 6 of Table 1. A three-layer cast film of this invention was prepared as above, substituting the EMA copolymer of this invention for the conventional EMA copolymer.

The adhesive strength of the EMA copolymer to the oriented polyester for each of these films was determined using the method of Example 3. These measurements are summarized in Table 3.

Samples of these films were aged for 30 days at 80% relative humidity and at 72° F. The adhesive strengths of the films were determined using the method of Example 3. These measurements are also summarized in Table 3.

TABLE 3

| | | ADHESIVE STRENGTH, gm/in. | | | |
|---|---|---|---|---|---|
| RUN | EMA CO-POLYMER OF TABLE 1 | OPP-EMA-IONOMER[7] | OPP-EMA-IONOMER AGED 30 DAYS | OPET-EMA-PE[8] | OPET-EMA-PE AGED 30 DAYS |
| F[6] | B | 310 | 270 | 140 | 70 |
| 12 | 4 | 380 | 270 | 320 | 90 |
| G[6] | A | 270 | 270 | 160 | 80 |
| 13 | 3 | 680 | 720 | 450 | 190 |
| 14 | 6 | 545 | 555 | 450 | 255 |

[6]Runs F and G are comparative examples.
[7]OPP - oriented polypropylene.
[8]OPET - oriented polyester; PE - polyethylene.

EXAMPLE 7

CONTINUOUS SAPONIFICATION OF EMA COPOLYMER OF THIS INVENTION IN AN EXTRUDER

A Werner & Pfleiderer corrosion resistant extruder was fitted with a liquid injection system. Downstream extruder equipment included a water cooling bath and a pelletizer.

The extruder was started, followed by the solid feeder and the liquid feeder. The screws were maintained at 400 rpm. EMA copolymer of this invention, made by the method shown for Run 3 in Table 1 and containing about 12 or 20 wt % methyl acrylate and having a melt index (MI) of 400 to 630 gm/10 min., was fed into the extruder, and was reacted at a temperature between about 255° and 270° C. in the extruder with 50% aqueous sodium hydroxide solution. The saponification reaction started in the injection zone and continued through the reaction zone. Excess water and by-product methanol were removed in a devolatilization zone. The reaction product was extruded through a die as strands, cooled in a water bath and pelletized.

The following table summarize properties of the resultant ionomer.

TABLE 4

| | EMA COPOLYMER PROPERTIES | | IONOMER PROPERTIES | |
|---|---|---|---|---|
| | | | MOL % OF MA CONVERTED | |
| RUN | MA % | MI (g/10 min.) | TO SODIUM ACRYLATE | MELT-POINT TEMP. (°F.) |
| 15 | 12 | 630 | 62 | 194 |
| 16 | 12 | 630 | 86 | 181 |
| 17 | 12 | 630 | 100 | 189 |
| 18 | 12 | 400 | 60 | 207 |
| 19 | 12 | 400 | 83 | 210 |
| 20 | 12 | 50 | 83 | 208 |
| 21 | 12 | 400 | 99 | 190 |
| 22 | 20 | 440 | 47 | 189 |
| 23 | 20 | 440 | 51 | 187 |
| 24 | 20 | 440 | 61 | 181 |
| 25 | 20 | 440 | 72 | 147 |
| 26 | 20 | 400 | 35 | 198 |
| 27 | 20 | 400 | 42 | 196 |
| 28 | 20 | 400 | 50 | 196 |
| 29 | 20 | 400 | 65 | 198 |

As the data above show, ionomers made from the ethylene-alkyl acrylate copolymer of this invention have unexpectedly high melt-point temperatures, particularly those ionomers made from a copolymer having a low alkyl acrylate content. These ionomers are useful in applications which require service temperatures at or near the boiling point of water. The superior adhesive strength of these ionomers over ionomers made from conventional EAA copolymers permits their use in multi-layer constructions such as food wrap and food bags.

The above-disclosed process for making copolymers of this invention is also applicable to make ethylene-acrylic acid copolymers. Acrylic and/or methacrylic acid is substituted in place of the alkyl acrylate above to produce ethylene-acrylic acid copolymers having improved melt-point temperatures and/or improved adhesion to polymeric substrates such as polyester or polypropylene over ethylene-acrylic acid copolymers made by the conventional process disclosed above, substituting acrylic and/or methacrylic acid for the alkyl acrylate of the conventional process above.

We claim:

1. Ionomers of an ethylene-alkyl acrylate copolymer having about 2 to about 90 percent of the alkyl acrylate groups ionized by saponification with alkali metal ions, wherein the ethylene-alkyl acrylate copolymer before saponification exhibits a melt-point temperature which is at least 6° C. greater than a reference copolymer having the same amount and type of alkyl acrylate and ethylene, wherein the reference copolymer is made in a multi-zone autoclave reactor and the ratio of alkyl acrylate to ethylene in each reactor zone is about equal to the overall ethylene to alkyl acrylate ratio fed to the multi-zone autoclave reactor.

2. The ionomer of claim 1 wherein the alkyl acrylate copolymer is prepared by (a) feeding overall an amount by weight, A, of alkyl acrylate and an amount by weight, E, of ethylene to a multi-zone autoclave polymerization reactor;

(b) introducing an effective amount of an initiator and at least a portion, $E_1$, of the total amount of ethylene into a first reaction zone of the reactor;

(c) concurrently introducing a portion, $A_1$, of alkyl acrylate to said first reaction zone such that the ratio $A_1/E_1$ is at least 20% more than or is at least about 20% less than the ratio A/E for the reactor overall; and (d) feeding any remaining portions of initiator, ethylene and alkyl acrylate to a subsequent reaction zone or zones.

3. The ionomer of claim 2 wherein the alkyl acrylate is methyl acrylate, ethyl acrylate, butyl acrylate or mixtures thereof.

4. The ionomer of claim 3 wherein the ethylene-alkyl acrylate copolymer is ethylene methyl acrylate copolymer which before saponification exhibits an average melt-point temperature equal to or greater than the value obtained from the expression: temperature (degree F)=248–3.1 Y, wherein Y is the weight percent methyl acrylate and is greater than 5 weight percent.

5. The ionomer of claim 4 wherein the methyl acrylate content before saponification is equal to or greater than 15 weight percent.

6. The ionomer of claim 3 wherein the ethylene-alkyl acrylate copolymer is ethylene butyl acrylate copolymer Which before saponification exhibits an average melt-point temperature equal to or greater than the value obtained from the expression: temperature (degree F)=240–2.31Z, wherein Z is the weight percent butyl acrylate and is greater than 5 weight percent.

7. The ionomer of claim 6 wherein the butyl acrylate content is equal to or greater than 15 weight percent.

8. The ionomer of claim 2 having a ratio $E_1/E$ which is between 0.10 and 0.90.

9. Ionomer of the copolymer of claim 1 having about 2 to about 90 percent of the alkyl acrylate groups ionized by saponification with sodium cations.

* * * * *